United States Patent [19]

Tsuzuki et al.

[11] 4,293,893
[45] Oct. 6, 1981

[54] APPARATUS FOR CONTROLLING LIGHT PROJECTION ANGLE OF HEAD LAMP OF MOTOR VEHICLE

[75] Inventors: Yoshihiko Tsuzuki, Anjo; Sumihiro Kaga, Inazawa; Nobuhito Hobo, Inuyama, all of Japan

[73] Assignee: Nippondenso Co., Ltd., Kariya, Japan

[21] Appl. No.: 71,568

[22] Filed: Aug. 31, 1979

[30] Foreign Application Priority Data

Oct. 20, 1978 [JP] Japan .................................. 53-129655

[51] Int. Cl.$^3$ ........................ B60Q 1/10; F21V 21/30; B60Q 1/06
[52] U.S. Cl. ................................ 362/38; 307/10 LS; 362/66; 362/71; 362/271; 362/272; 362/44; 362/428
[58] Field of Search ....................... 362/38, 44, 66, 71, 362/188, 271, 272, 428; 280/421; 307/10 LS

[56] References Cited

U.S. PATENT DOCUMENTS

| | | | |
|---|---|---|---|
| 3,903,984 | 9/1975 | Andres et al. | 362/38 |
| 3,955,173 | 5/1976 | Martin | 362/38 |
| 4,194,235 | 3/1980 | Heinlein | 362/38 |

*Primary Examiner*—Edward A. Miller
*Assistant Examiner*—Irwin Gluck
*Attorney, Agent, or Firm*—Cushman, Darby & Cushman

[57] ABSTRACT

An apparatus for controlling angular position of optical axis of a head lamp assembly for a motor vehicle. An actuator is supplied selectively with the atmospheric pressure and a negative pressure available from an intake conduit of an internal combustion engine thereby to produce corresponding mechanical displacements. A detector for detecting the angular position of the optical axis of the head lamp assembly responds to the mechanical displacements of the actuator to change-over successively the contact states of a plurality of paired electric contacts. A command unit for setting the angular position of the optical axis of the head lamp assembly is provided which includes a plurality of paired electric contacts connected in one-to-one correspondence to the paired contacts of the optical axis position detector. A signal for setting the optical axis of the head lamp assembly is produced in dependence on the contact states of the optical axis position detector.

3 Claims, 3 Drawing Figures

TO HEAD LAMPS

TO HEAD LAMPS

APPARATUS FOR CONTROLLING LIGHT PROJECTION ANGLE OF HEAD LAMP OF MOTOR VEHICLE

The present invention relates to an apparatus for controlling optical axis of a head lamp assembly for a motor vehicle whose angular position can be varied in a vertical direction in dependence on loads on board of the motor vehicle.

Attempts have been heretofore made to vary angular position of the optical axis of a head lamp assembly of a motor vehicle in dependence on the load on board so that the optical axis may be orientated in vertical directions to some degree upon increase of the load on board, with a view to protection of the driver of an oncoming motor vehicle from being dazzled. The hitherto known apparatus for varying the light projection angle of the head lamp assembly may be generally classified into a purely mechanical type and a hybrid type including an electrical control device. The present invention concerns the so-called hybrid type apparatus. An object of the invention is to provide a control apparatus for controlling the optical axis of a head lamp assembly for a motor vehicle including an actuator which is selectively supplied with the atomospheric pressure and a negative pressure available from an intake conduit of engine through associated electromagnetic valves, which are selectively operated by an electric signal produced from an angular position detector for the head lamp assembly in cooperation with an illuminating angle command unit, thereby to set the illuminating angle of the head lamp assembly in accordance with the load on board.

According to the invention, the illuminating or light projecting angle of the head lamp assembly is determined through cooperation of a linkage mechanism interconnecting the actuator and the head lamp assembly, the illumination or projection angle detector, the light projection angle setting means and the electromagnetic valves for changing over the atmospheric pressure and the negative pressure available from the engine intake conduit. The actuator can be implemented in a simplified structure. Further, since the negative pressure and the atmospheric pressure are utilized as the control medium, provision of a special pressure source is unnecessary. Maintenance may be substantially obviated. Possible leakage of the operative fluid medium will involve no danger. The electric circuit can be easily implemented by a simple combination of switch circuits.

These and other objects, features and advantages of the invention will become more apparent from the following description taken in conjunction with the accompanying drawings, in which.

Now, the invention will be described in conjunction with the exemplary embodiments shown in the accompanying drawings.

Figure 1:
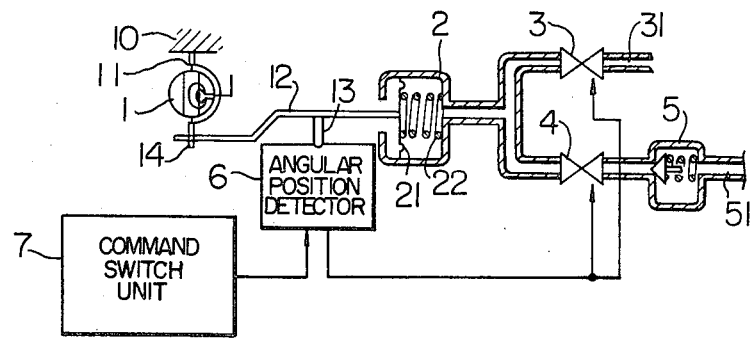
FIG. 1 shows schematically a general arrangement of the control apparatus according to an embodiment of the invention.

FIG. 1 shows schematically a general arrangement of a system for controlling optical axis of a head lamp of a motor vehicle. Numeral 1 denotes a head lamp assembly of a motor vehicle and incorporates therein a filament supplied with electric energy from a battery installed on the motor vehicle and a reflecting mirror 10. The front lamp assembly 1 is mounted on a body 10 of the motor vehicle through a swingable hinge member 11. Through manipulation of a lever 14 mounted integrally with the head lamp assembly 1, the projection angle of the lamp can be varied in a vertical direction. Reference numeral 2 denotes a diaphragm actuator which is adapted to be operated in response to a negative pressure available from an intake conduit of an internal combustion engine of a motor vehicle. The diaphragm actuator 2 is constituted by a diaphragm 21 and a bias or return spring 22. The diaphragm 21 is connected to the lever 14 through a link rod so that movement of the diaphragm 21 is transmitted to the lever 14. More specifically, when a negative pressure introduced into the diaphragm chamber of the actuator 2, the diaphragm 21 is moved against the biasing force of the spring 22, as the result of which the lever 14 is moved to the right as viewed in FIG. 1 under the pulling force exerted by the connecting link 12. Consequently, the optical axis or projecting direction of the head lamp assembly 1 is inclined downwardly. When no negative pressure acts on the diaphragm 21, the optical axis of the head lamp assembly 1 is orientated upwardly.

Reference numerals 3 and 4 denote electromagnetic valves, respectively. The electromagnetic valve 3 is disposed in a conduit 31 opend to the atmosphere. On the other hand, the electromagnetic valve 4 is installed in a negative pressure conduit 51 which is connected to an intake of suction conduit of an internal combustion engine (not shown) through a check valve 5. Both the electromagnetic valves 3 and 4 may be of an identical structure and exhibit same function. When a current is supplied to the solenoid coil of the electromagnetic valve, the latter is opened. Otherwise, the valve remains as closed to block the fluid flow through the associated conduits. When the valve 3 is opened upon electrical energization, the diaphragm chamber of the actuator 2 is communicated to the atmosphere through the conduit 31, which results in that the link rod 12 is moved to the left as viewed in FIG. 1 under the force of the bias spring 22. On the other hand, when the electromagnetic valve 4 is opened, the intake negative pressure is introduced to the diaphragm chamber of the actuator 2 through the conduit 51 and the check valve 5. Consequently, the link rod 12 is displaced to the right as viewed in FIG. 1 against the force of the return spring 22. The check valve 5 serves to assure a negative pressure required for the operation of the actuator by blocking the conduit 51, even when the negative pressure in the engine intake conduit is decreased to an extremely low level as in the case where the throttle valve of the engine is fully opened.

Numeral 6 denotes an angular position detector for detecting the angle at which the light beam is projected forwardly from the head lamp assembly 1. The detector 6 is provided with a sensor member 13 fixedly connected to the link rod 12 at an intermediate portion thereof. The movement of the link rod 12 is detected by the sensor member 13, whereby the corresponding electric output signal is produced by the projection or illumination angle detector 6. Numeral 7 designates a command switch unit for commanding the projection or illumination angle of the head lamp assembly 1. In dependence on the difference between the command signal from the controller 7 and the angular position signal output from the detector 6, either the electromagnetic valve 3 or 4 is operated thereby to establish the coincidence between the command signal and the detector output signal through the operation of the actuator 2.

Figure 2:
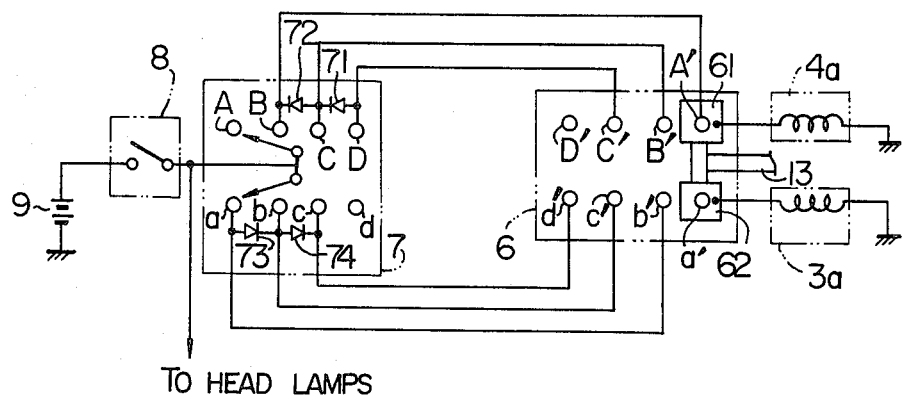
FIG. 2 shows an electric circuit of a four-step switching type used in the control apparatus shown in FIG. 1.

Next, referring to FIG. 2, description will be made on an electric circuit to be used in combination with the apparatus shown in FIG. 1. The circuit is arranged on the assumption that the projection or illumination angle of the head lamp assembly 1 is to be changed over four times on the step-by-step basis. The command switch unit 7 is constituted by a four-contact type selector switch which is adapted to interlock two circuits. Numeral 9 denotes a car battery and 8 denotes a switch for the head lamp assembly 1. Upon closing of the switch 8, the head lamp is lit through a wiring conductor (not shown) and at the same time the control circuit shown in FIG. 2 is electrically connected to the power supply source or car battery 9.

The command selector switch 7 comprises contacts A, B, C and D for controlling downward angular displacements or inclinations of the head lamp assembly 1 and contacts a, b, c and d for commanding the upward angular displacements or inclinations of the head lamp assembly 1. Each of the contacts A, B, C and D is interlocked with each of the contacts a, b, c and d in pairs so that each of the paired contacts can be simultaneously opened and closed. Reference numerals 71, 72, 73 and 74 denote diodes. Diode 71 is connected between the contacts C and D in the forward direction relative to the contact C, while the diode 72 is connected between the contacts C and D in the forward direction relative to the contact B. On the other hand, the diode 73 is connected between the contacts a and b forwardly relative to the contact b, while the diode 74 is connected between the contacts b and c forwardly to the contact c. The paired contacts A and a define the initial command position for the downward inclinations of the head lamp assembly. Starting from the initial command position, the optical axis of the head lamp assembly can be successively and progressively inclined downwardly by changing over sequentially the paired contacts B and b, C and c and then D and d in this order. The detector 6 has four contacts A', B', C' and D' for detecting the downward inclinations of the head lamp assembly and additionally four contacts a', b', c' and d' for detecting upward inclinations of the head lamp assembly. It should be noted that the contact A' and B, B' and C, C' and D, b' and a, c' and b, and d' and c are connected in pair, respectively. The contacts A, d, a' and D' are open or idle contacts. Reference numerals 61 and 62 denote electrodes which are interlocked with the sensor member 13 described hereinbefore and adapted to open and close simultaneously the paired contacts A';a', B';b', C';c' and D';d', respectively. The electrode 61 is electrically connected to one end of the exciting coil 4a of the electromagnetic valve 4 for the negative pressure, while the other end of the coil 4a is grounded to earth. On the other hand, the electrode 62 is electrically connected to one end of the solenoid coil 3a for the electromagnetic valve 3 which has the other end also grounded. The electrodes 61 and 62 are mechanically connected to each other by means of an electrical insulator which in turn is fixedly connected to the sensor member 13. Thus, the electrodes 61 and 62 are caused to move from the paired contacts A' and a' toward the paired contacts D' and d' or vice versa in dependence on the displacement of the sensor member 13. It should be mentioned that when the electrode 61 is moved from the contact A' toward the contact B', the contact A' is opened after the contact made to both contacts A' and B', for example. The same applies to the electrode 62.

In operation, the head lamp switch 8 is at first closed to light up the head lamp 1. Assuming that only the driver is riding and the control command switch 7 is at the initial set position corresponding to the paired contacts A and a, no current is supplied to the electrode 61 with the result that the electromagnetic valve 4 remains closed, because the contact A is the idle contact. Further, because the contact a' is also idle, the electromagnetic valve 3 is maintained in the closed state. Under the circumstance, the actuator 2 is not operated. Thus, the head lamp assembly 1 is held in the initial set position. In this state, vibrations of the vehicle transmitted to the head lamp assembly 1 can be absorbed by the actuator 2.

Assuming that the load on board becomes maximum and the control command switch 7 is set to the contact position corresponding to the contacts A and d, no current is supplied to the electrode 62 independently from the contact positions thereof because of the contact d being idle, as the result of which the electromagnetic valve 3 remains in the closed state. To the contrary, the contacts A', B' and C' become electrically alive because the contacts C and B are electrically coupled to the contact D through the diode 71 and 72. As a consequence, the electromagnetic valve 4 is operated through the electrode 61 to allow the actuator 2 to be operated by a negative pressure available from the intake conduit of the engine, whereby the head lamp assembly 1 is inclined downwardly by way of the link rod 12. When the electrode 61 attains the position of the contact D' after having passed by the contact C', the electromagnetic valve 4 is deenergized to block the transmission of the negative pressure in the conduit 51. The actuator 2 is held at the position attained at that time.

Assuming that the load on board is decreased and the command switch 7 is set to the contact position corresponding to the paired contacts B and b, only the contact B and hence the contact A' become electrically alive, while the contacts C and D become electrically dead because the diodes 72 and 71 are then biased backwardly. Since the contact b is electrically coupled to the contact C through the diode 74, both the contacts d' and c' become electrically alive, resulting in that the exciting coil 3a of the electromagnetic valve 3 is electrically energized to allow the actuator 2 to be communicated to the atmosphere. In this state, the rod 12 is pushed forwardly or to the left as viewed in FIG. 1 under the influence of the return spring 22. When the electrode 62 reaches the position d' after having passed by the contact c', the exciting coil 3a is deenergized, whereby the electromagnetic valve 3 is closed to stop the actuator 2 at the position attained at that instant. Thus, the head lamp assembly 1 is held at the position corresponding to the command position (B, b) set at the command or control switch unit 7. When overshoot occurs in the operation of the actuator 2 with reference to the commanded position, the electrode 61 will then be brought into contact with the contact A' which is electrically alive, as the result of which the electromagnetic valve 4 is opened to allow the actuator 2 to be operated under the negative pressure supplied from the intake conduit of the engine. The rod 12 is then displaced to the right as viewed in FIG. 1 to move the electrode 61 away from the contact A', whereupon the electromagnetic valve 4 is deenergized to block the negative pressure conduit 51.

Figure 3:
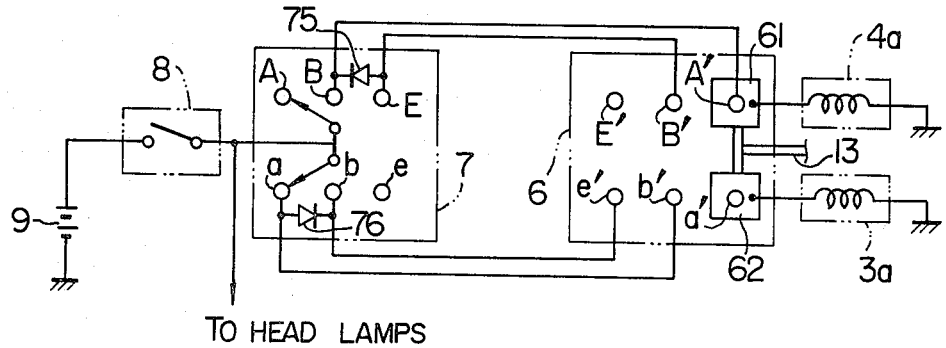
FIG. 3 is a circuit diagram for a three-step switching type control apparatus according to another embodiment of the invention.

Although the circuit shown in FIG. 2 is intended for changing-over operations at four steps, it will be appreciated that the teaching of the invention can be equally applied to the three-step or five-step changing-over switch apparatus. An exemplary embodiment of the control circuit adapted for effecting the change-over operation at three steps. In this figure, same reference numerals as those shown in FIG. 2 denote like parts. A diode 75 is connected between the contact B and E forwardly relative to the contact B. Another diode 76 is inserted between the contact a and b in the forward direction relative to the contact b. Contacts B and A, E and B', a and b', and b and e' are connected to each other, respectively. The contacts A, E' and e are idle contact. Operation of the circuit shown in FIG. 3 is effected in a similar manner as the circuit shown in FIG. 2. Accordingly, further description will be unnecessary.

It should be mentioned that the movable contact of the command selector unit 7 may be manually operated or alternatively automatically operated in dependence on the load on the vehicle.

We claim:

1. An apparatus for controlling the optical axis of a head lamp assembly of a motor vehicle, comprising:
    a head lamp assembly supported so that the light projecting axis thereof can be angularly varied in upward and downward directions;
    an actuator adapted to be selectively supplied with the atmospheric pressure and a negative pressure available from an intake conduit of an internal combustion engine of said motor vehicle through associated electromagnetic valves and produce mechanical displacements in dependence of said pressures;
    a linkage mechanism for transmitting said mechanical displacements for bringing about corresponding variations in the angular position of said light projecting optical axis of said head lamp assembly;
    first switch means for detecting angular position of said light projecting optical axis of said head lamp assembly, said first switch means including paired electric contacts, the contacting states of which are sequentially changed over in response to the operation of said linkage mechanism;
    second switch means for setting angular position of said light projecting optical axis of said head lamp assembly in response to command, said second switch means including paired electric contacts, the contacting states of which are sequentially changed over to produce said command;
    and an electric circuit which responds to difference in the contacting states between said first and second switch means thereby to produce correspondingly energizing signals for said electromagnetic valves.

2. An apparatus for controlling optical axis of a head lamp assembly of a motor vehicle according to claim 1, wherein said second switch means includes first, second, third and fourth paired electric contacts, and first and second diodes connected between ones of said second and third paired contacts and between ones of said third and fourth paired contacts, respectively, in the forward direction relative to the order of the fourth, the third and the second paired contacts, while third and fourth diodes are connected between the other ones of said second and third paired contacts, respectively, in the forward direction relative to the order of the first, the second and the third paired contacts.

3. An apparatus for controlling optical axis of a head lamp assembly of a motor vehicle according to claim 1, where said second switch means includes first, second and third paired electric contacts, a first diode connected between ones of said second and third paired contacts in the forward direction relative to the order of the third and the second paired contacts, and a second diode connected between the others of said first and second paired contacts in the forward direction relative to the order of the first and the second contacts.

* * * * *